United States Patent
Mantell

(10) Patent No.: US 6,900,907 B2
(45) Date of Patent: May 31, 2005

(54) OVERLAPPING DROP ASSIGNMENT FOR MULTI-LEVEL INK JET PRINTING

(75) Inventor: David A. Mantell, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 918 days.

(21) Appl. No.: 09/731,662

(22) Filed: Dec. 8, 2000

(65) Prior Publication Data

US 2002/0113830 A1 Aug. 22, 2002

(51) Int. Cl.⁷ .......................... G06F 15/00; B41J 2/205
(52) U.S. Cl. ........................... 358/1.7; 358/1.7; 347/15
(58) Field of Search ................................ 358/1.7, 1.16; 347/15, 19, 40, 37

(56) References Cited

U.S. PATENT DOCUMENTS

| 4,642,653 A | 2/1987 | Ito et al. |
| 4,686,538 A | 8/1987 | Kouzato |
| 4,748,453 A | 5/1988 | Lin et al. |
| 5,192,959 A | 3/1993 | Drake et al. |
| 5,784,496 A | 7/1998 | Mantell |
| 5,835,238 A | 11/1998 | Mantell |
| 5,892,524 A * | 4/1999 | Silverbrook ................ 347/15 |
| 6,042,211 A * | 3/2000 | Hudson et al. ............. 347/15 |
| 6,068,361 A | 5/2000 | Mantell |
| 6,179,407 B1 * | 1/2001 | Bockman ..................... 347/40 |

FOREIGN PATENT DOCUMENTS

| EP | 0 816 102 A2 | 1/1998 |
| EP | 0 970 815 A1 | 1/2000 |

* cited by examiner

Primary Examiner—Kimberly Williams
Assistant Examiner—Saeid Ebrahimi Dehkordy
(74) Attorney, Agent, or Firm—Oliff & Berridge, PLC

(57) ABSTRACT

To avoid the image artifacts of a uniform drop-per-pixel, a drop assignment overlap is introduced. Larger and lower drops are printed simultaneously to represent uniform gray level. The regions at which the first number of drops and the second number of drops are put down overlap. Thus, a pattern in which a uniform number of drops is put down at every pixel is eliminated, and a pattern of overlapping first and second drops is obtained.

20 Claims, 10 Drawing Sheets

OVERLAPPING DROP ASSIGNMENT FOR MULTI-LEVEL INK JET PRINTING

BACKGROUND OF THE INVENTION

1. Field of Invention

This invention relates to systems and methods for introducing a drop assignment overlap to reduce or eliminate image defects or artifacts in ink jet images.

2. Description of Related Art

Liquid ink printers, which includes both continuous stream type printers and drop-on-demand type printers, such as piezoelectric, acoustic, phase change wax-based or thermal printers, have at least one cartridge from which droplets of ink are ejected or otherwise directed towards a recording medium. Within the cartridge, the ink is contained in a plurality of channels. Power pulses cause the droplets of ink to be expelled as required from print elements provided at the end of the channels. The ink within the channel retracts and separates from the bulging ink to form a droplet moving in a direction away from a print element and towards the recording medium where the drop is deposited to form a dot or spot of ink. The channel then refills by drawing ink from a supply container of the liquid ink.

An input image to the liquid ink printer may include a continuous tone image to be converted to a binary image in such a manner that the printed image preserves the appearance of the tonal gradations in the original image. In the digital reproduction of documents, a bitmap is created which may be described as an electronic image with discrete signals, i.e. pixels, defined by a position and a density. In such a system, density is described as one level in a number of possible states or levels. When more than two levels of density are used in the description of the image, the levels are often called "gray levels", indicating that the gray levels vary between a maximum and a minimum.

SUMMARY OF THE INVENTION

When printing two or more small ink drops per pixel, there is a gray level at which uniform drops are printed for every pixel. However, if these uniform ink drops were put down perfectly at every pixel at this gray level, image artifacts are apt to occur. In particular, this gray level could look significantly smoother than the surrounding gray levels, resulting in uniformity in this gray level, but non-uniformity over the entire resulting image. Further, systematic jet misdirectionality may produce systematic image defects. That is, the uniformity in the gray level will appear significantly different from the adjacent surrounding levels. Either the gray level looks too smooth or can contain significant artifacts, depending on the presence or absence of systematic drop placement errors. These defects are perceptible to the human eye and thus can be unacceptable for a high-quality prints.

FIGS. 1 and 2 show examples of the image artifacts in a uniform-drop-per-pixel gray level adjusted by the systems and methods according to this invention. As shown in FIG. 1, for example, if the ink drops were put down perfectly, this level could look significantly smoother than the surrounding levels. That is, the uniform-drop-per-pixel area may look smoother than adjacent image areas. As shown in FIG. 2, drop placement defects may also result from systematic jet misdirectionality. These defects are more easily seen in perfectly uniform field of drops.

Image artifacts of a uniform-drop-per-pixel gray level is undesirable because, if the ink droplets are ejected to a recording medium without adjusting for the artifacts, the final printed image will include the artifacts. For example, by introducing uniformity of a gray level with the less than uniform surrounding levels, these differences in uniformity and smoothness, even if only a few mils or tens of microns, are well within the visual acuity of the human eye. Similarly, the drop placement defects are also well within the eye's visual acuity. Since the human eye can sense these image artifacts, the quality of the resulting image suffers greatly even for small artifacts.

The methods and systems of this invention avoid image artifacts that occur in uniform-drop-per-pixel gray levels by introducing a drop assignment overlap that breaks up the pattern of a uniform-drop-per-pixel gray level.

This invention separately provides systems and methods for printing images that reduce introduced image artifacts in the printed image.

In various exemplary embodiments of the methods and systems according to this invention, a second number of drops are printed for some pixels, where the gray level at which the second number of drops start printing is lower than the uniform-drop-per-pixel gray level.

In various exemplary embodiments of the methods and system according to this invention, the regions at which the first number of drops and the second number of drops are put down overlap. Thus, a randomized pattern of overlapping first and second number of drops is obtained.

In various exemplary embodiments of the methods and system according to this invention, image processing for the first and second number of drops can be different.

These and other features and advantages of this invention are described in or are apparent from the following detailed description of the exemplary embodiments.

BRIEF DESCRIPTION OF THE DRAWINGS

Various exemplary embodiments of this invention will be described in detail, with reference to the following figures, wherein:

FIG. 7 shows one exemplary embodiment of a portion of an image without the drop assignment according to this invention.

FIG. 8 shows one exemplary embodiment of the portion of the image resulting from the drop assignment.

DETAILED DESCRIPTION OF PREFERRED EMBODIMENTS

Figure 3:
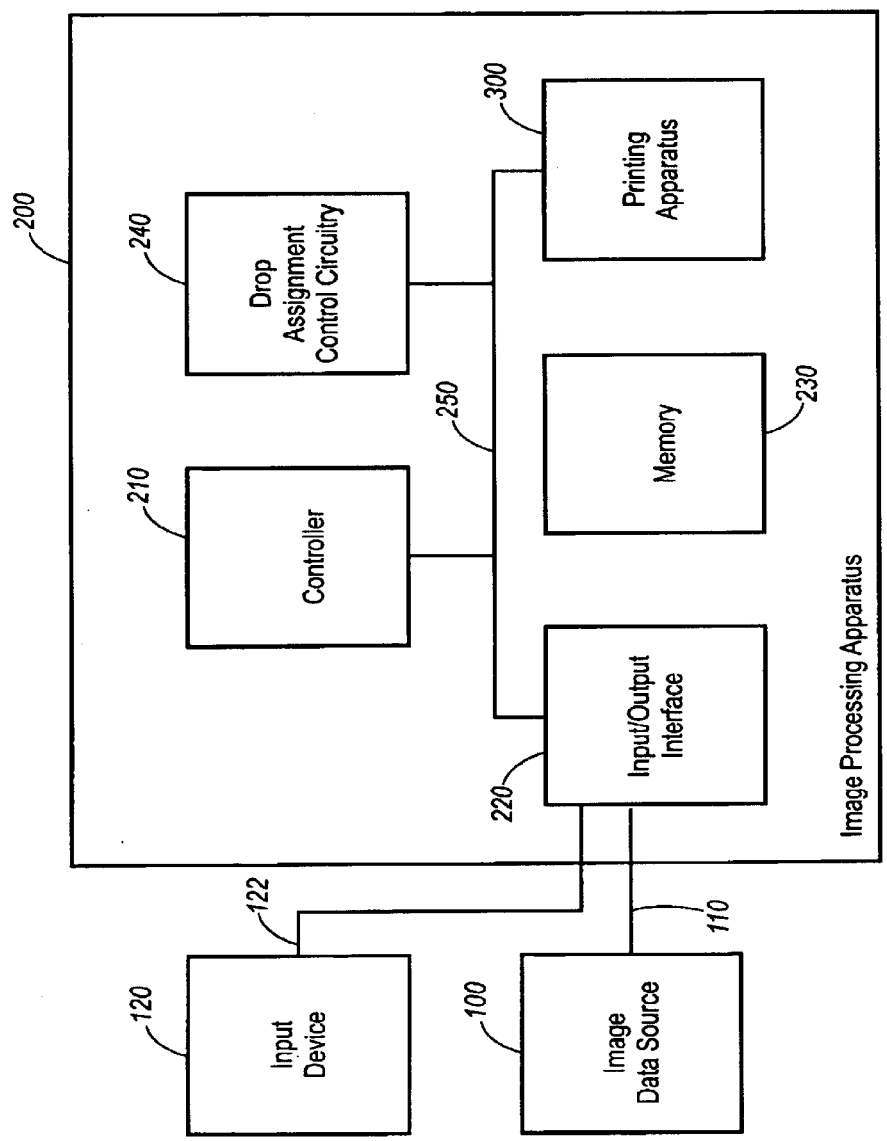
FIG. 3 shows one exemplary embodiment of an image processing apparatus that incorporates drop assignment control according to this invention.

FIG. 3 shows one exemplary embodiment of an image processing apparatus 200 incorporating drop assignment control in accordance with this invention. As shown in FIG. 3, an image data source 100 and an input device 120 are connected to the image processing apparatus 200 over links 110 and 122, respectively. The image data source 100 can be a digital camera, a scanner, or a locally or remotely located computer, or any other known or later developed device that is capable of generating or otherwise providing electronic image data. Similarly, the image data source 100 can be any suitable device that stores and/or transmits electronic image data, such as a client or a server of a network. The image data source 100 can be integrated with the image processing apparatus 200, or the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from electronic image data, the electronic image data could have been generated at any time in the past. Moreover, the electronic image data need not have been generated from an original physical document, but could have been created from scratch electronically. The image data source 100 is thus any known or later developed device which is capable of supplying electronic image data over the link 110 to the image processing apparatus 200. The link 110 can thus be any known or later developed system or device for transmitting the electronic image data from the image data source 100 to the image processing apparatus 200.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the link 110 described above, the link 122 can be any known or later developed device for transmitting control signals and data input using the input device 120 from the input device 120 to the image processing apparatus 200.

Figure 1:
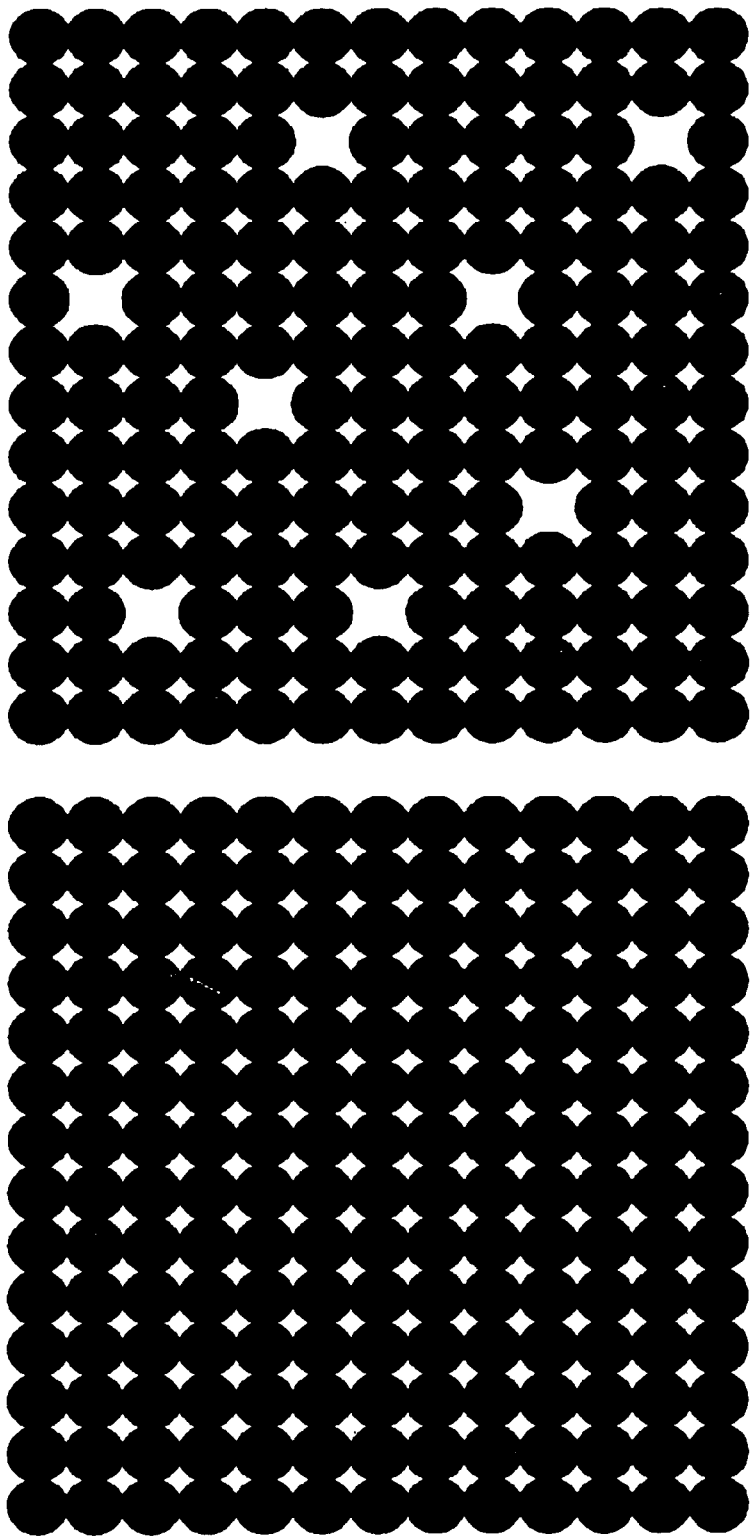
FIGS. 1 and 2 show the image artifacts of a uniform-drop-per-pixel gray level portion of an image.
Figure 2:
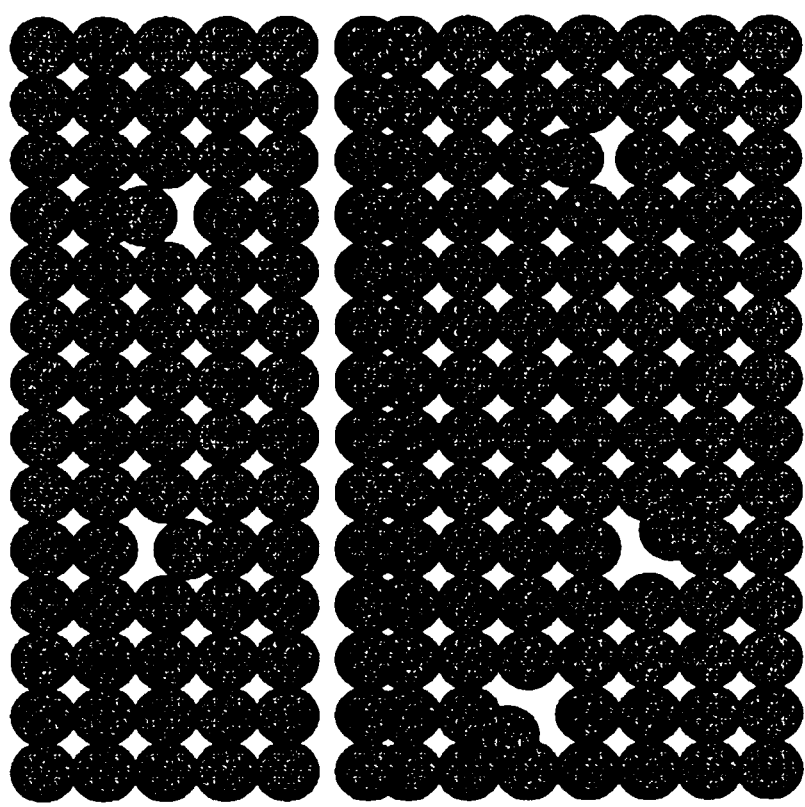

As shown in FIG. 2, the image processing apparatus 200 includes a controller 210, an input/output interface 220, a memory 230, an drop assignment control circuit 240 and a printing apparatus 300, each of which is interconnected by a control and/or data bus 250. The links 110 and 122 from the image data source 100 and the input device 120, respectively, are connected to the input/output interface 220. The electronic image data from the image data source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed memory device.

The image processing apparatus 200 shown in FIG. 2 is connected to the image output terminal 300 over the control and/or data bus 250. Alternatively, the image output terminal 300 may be an integral part of the image processing apparatus 200. An example of this alternative configuration would be a digital copier or the like. It should be appreciated that the image processing apparatus 200 can be any known or later developed type of image processing apparatus. There is no restriction on the form the image processing apparatus 200 can take.

The links 110 and 122 can be any known or later developed device or system for connection, including a direct cable connection, a connection over a wide area network or a local area network, a connection over an intranet, a connection over the Internet, or a connection over any other distributed processing network or system. In general, the links 110 and 122 can be any known or later developed connection system or structure usable for connection.

The drop assignment circuit 240 inputs signals from the image data source 100. The drop assignment circuit 240 determines the assignment of the ink drops in an output image and selects the drop assignment values stored in the memory 230 for each print element based on the input signals. The drop assignment circuit 240 outputs the selected drop assignment values to the image output terminal 300 over the control and/or data bus 250. That is, based on the determination made by the drop assignment circuit 240 and the image data, the drop assignment circuit 240 controls the drop assignment of the print elements in the printing apparatus 300. Accordingly, when the output images are output to the image output terminal 300, the resulting image will be output on a receiving substrate or display with reduced or eliminated image artifacts.

While FIG. 3 shows the drop assignment control circuit 240 and the printing apparatus 300 as portions of an integrated system, the drop assignment control circuit 240 could be provided as a separate device from the printing apparatus 300. That is, the drop assignment control circuit 240 may be a separate device attachable upstream of a stand-alone printing apparatus 300. For example, the drop assignment control circuit 240 may be a separate device which interfaces with both the image data source 100 and the printing apparatus 300.

Furthermore, the drop assignment control circuit 240 may be implemented as software on the image processing apparatus 200 or the image data source 100. For example, it should be appreciated that the drop assignment control circuit can be provided in, but is not limited to, a user's personal computer, a remote host computer, a specialized computer and the like. Other configurations of the elements shown in FIG. 2. may be used without departing from the spirit and scope of this invention.

It should be appreciated that, according to the systems and methods of this invention, each print element is controlled to form the image based on the drop assignment, so that, when the image is formed on, or transferred to, the receiving medium, image artifacts for that image on the receiving medium are reduced, if not eliminated.

Figure 4:
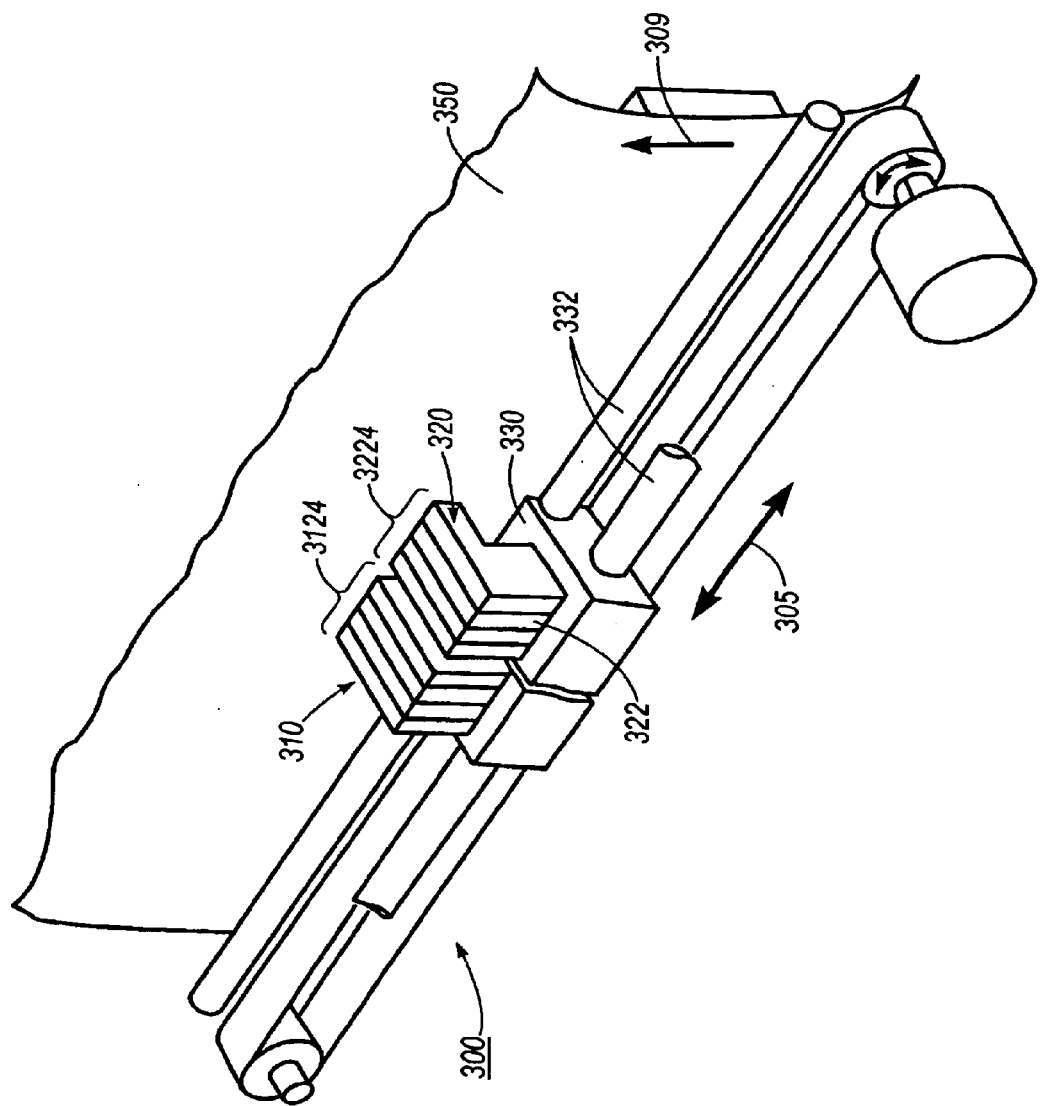
FIG. 4 shows one exemplary embodiment of a printing apparatus that incorporates the drop assignment control of this invention.

FIG. 4 shows one exemplary embodiment of a portion of the printing apparatus 300 usable with the drop assignment control systems and methods according to this invention. As shown in FIG. 4, the printing apparatus 300 has first and second cartridges 310 and 320 mounted on a carriage 330 supported by carriage rails 332. The carriage rails 332 extend along the media motion or fast scan direction. The carriage 330 moves along the carriage rails 332.

Each of the cartridges 310 and 320 includes housings 312 and 322, respectively, containing fluid, such as, for example, ink. Each of the cartridges 310 and 320 selectively expels first and second droplets of fluid, respectively, under control of electrical signals received from drop assignment control circuit 240 through a signal cable. It should be appreciated that the housings 312 and 322 can each contain any fluid in which the expulsion of the droplets can be controlled. The fluid can include, but is not limited to including, various toners, waxes, conditioning fluids or overcoating fluids.

Each of the cartridges 310 and 320 contains a plurality of channels that carry the fluid from the housing 312 or 322 to a respective plurality of print elements 3124 and 3224 displaced relative to each other in the fast scan direction. This allows printing a plurality of rows of fluid drops. The separation between each of the print elements 3124 and 3224 in the fast scan direction corresponds to the drop pitch for a desired resolution.

When printing the fluid onto a receiving substrate or medium 350, the carriage 330 reciprocates or scans back and forth along the carriage rails 332 in the directions of the arrow 305. As the cartridges 310 and 320 reciprocate back and forth across the recording medium 350, such as a sheet of paper or transparency, droplets of fluid are expelled from selected nozzles of selected ones of the print elements 3124 and 3224 towards the recording medium 350. The print elements 3124 and 3224 are typically arranged in a linear array perpendicular to the scanning direction 305. During each pass of the carriage 330, the recording medium 350 is held in a stationary position. At the end of each pass, however, the recording medium 350 is stepped by a stepping mechanism under control of the printer controller 210 in the direction of an arrow 309. A carriage-type system is described in U.S. Pat. No. 4,748,453 to Lin et al., incorporated herein by reference in its entirety.

It should be appreciated that, although FIG. 4 shows the printing apparatus 300 as a carriage-type printer, any other printing or image forming apparatus which includes three or more print elements, such as a page width printer, may use the drop assignment control systems and methods according to this invention. A page width printer includes a stationary cartridge having a length sufficient to print across the width or length of a recording medium at a time. The page width cartridge includes a large number of print elements. The recording medium is continually moved past the page width cartridge in a direction substantially normal to the cartridge length and at a constant or varying speed during the printing process. A page width system is described in U.S. Pat. No. 5,192,959 to Drake et al., incorporated herein by reference in its entirety.

It should also be appreciated that, although FIG. 4 shows that each of the cartridges 310 and 320 has four print elements, each cartridge can contain any number of print elements. The print elements in each cartridge can include, but are not limited to including, various colors of ink, or various tones of one or more of the colors, or any other fluids.

Furthermore, although FIG. 4 shows that the printing apparatus includes two ink cartridges 310 and 320 mounted on the carriage 330, any number of cartridges may be mounted on the carriage 330. For example, it should be appreciated that only one cartridge may be used. That is, it should be appreciated that any number of ink cartridges may be included to provide multi-level output pixels.

Furthermore, it should also be appreciated that, although FIG. 4 shows that each of the cartridges 310 and 320 contains print elements as active arrays and are incorporated into a printing apparatus, each cartridge can be any active array structure usable to form an image formed of discretely created pixels, and the apparatus 300 can be any device that uses such active arrays. The active arrays in the multi-element active array structure can thus also include, but are not limited to, light emitting elements. An example of the multi-element active array structure including light emitting elements is described in the 959 patent. Other types of apparatus which can use multi-element active arrays and thus are usable with the image processing apparatus 200 according to this invention include but are not limited to, thermal ink jet printers, page-width ink jet printers, and the like, which are capable of outputting multiple drops per pixel.

Figure 5:
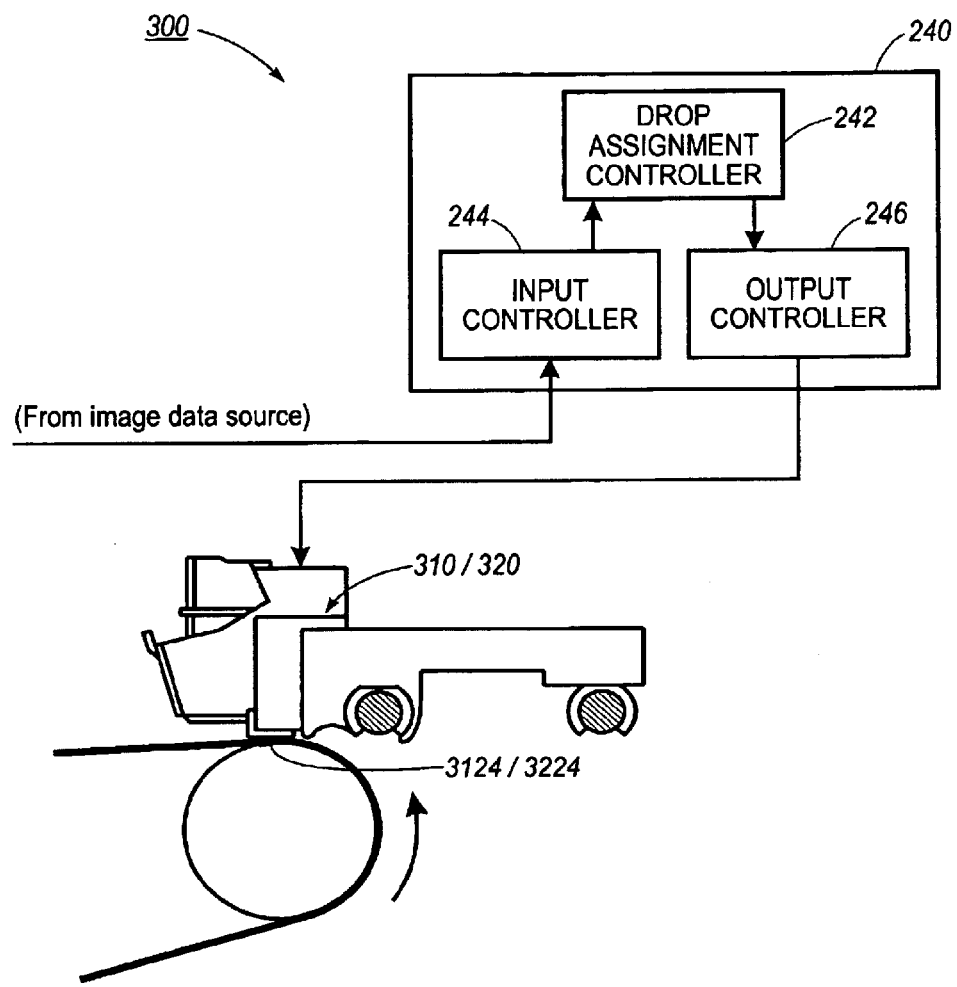
FIG. 5 shows in greater detail, one exemplary embodiment of the printing apparatus provided with the drop assignment control shown in FIG. 4.

FIG. 5 shows in greater detail one exemplary embodiment of the printing apparatus 300 shown in FIG. 4 and the drop assignment control circuit 240 shown in FIG. 3.

The drop assignment control circuit 240 controls ejection of ink droplets from the print elements 3124 and 3224 by selecting the determined drop assignment value stored in the memory 230 for each print element based on the input signals from the image data source 100.

During set-up, the drop assignment control circuit 240 assigns the drop ejection for each individual print element. This drop assignment includes, but is not limited to, adjusting the swath data shifts along the cartridge scan axis or adjusting the timing of the firing of the print elements 3124 and 3224 with respect to stored values. Further, this drop assignment includes, but is not limited to, adjusting the size or concentration of the ink droplets, or adjusting the number of ink droplets ejected from the print elements 3124 and 3224 with respect to stored values. In particular, it should be appreciated that any drop assignment may be provided in which a multi-level output is obtained, where the output pixel levels may be obtained by overlapping various number of ink droplets, overlapping various ink droplets of varying concentration, overlapping various sizes of ink droplets, and the like. In some circumstance, even the drop assignment for a pixel may be the assignment of no drops. It should be appreciated that the drop assignment is not limited as described above, and that the firing of the print elements can thus be assigned using any known or later developed method.

It should also be appreciated that, as discussed above, though two ink cartridges are shown, only one ink cartridge may be applied. That is, the drop assignment may include adjusting the size, concentration, number or the like, of the ink droplets ejected form the print element, to provide multi-level pixel output. In a case where a single ink cartridge is provided, the various levels are provided by the single ink cartridge.

At machine start-up and when recovering from unknown conditions, a control set-up procedure is performed. These are the only times the control set-up procedure is performed. Once initialized, the drop assignment control circuit 240 will determine and control the drop assignment for the print elements 3124 and 3224.

As shown in FIG. 5, the drop assignment circuit 240 includes an input controller 244, the output controller 246, and a drop assignment controller 242. The output controller 246 controls the output signals to the ink cartridges 310 and 320.

The input controller 244 inputs signals from the image data source 100. The drop assignment controller 242 selects the drop assignment values stored in the memory 230 for each print element based on the input signals to determine the assignment of the ink drops in an output image. The output controller 246 then outputs the selected drop assignment values to the image output terminal 300 over the control and/or data bus 250. The output controller 246 thus controllably outputs the control signals to the print elements 3124 and 3224 to control the firing of the ink droplets from the print elements 3124 and 3224.

The drop assignment controller 242 selects the drop assignment values using, for example, a nominal table. The nominal table serves to link the print element drop assignment values for each individual print element 3124 and 3224 of a given cartridge. During the print run, the drop assignment controller 242 selects the drop assignment values stored in the memory 230 for each print element based on the input signals from the image data source 100.

Figure 6:
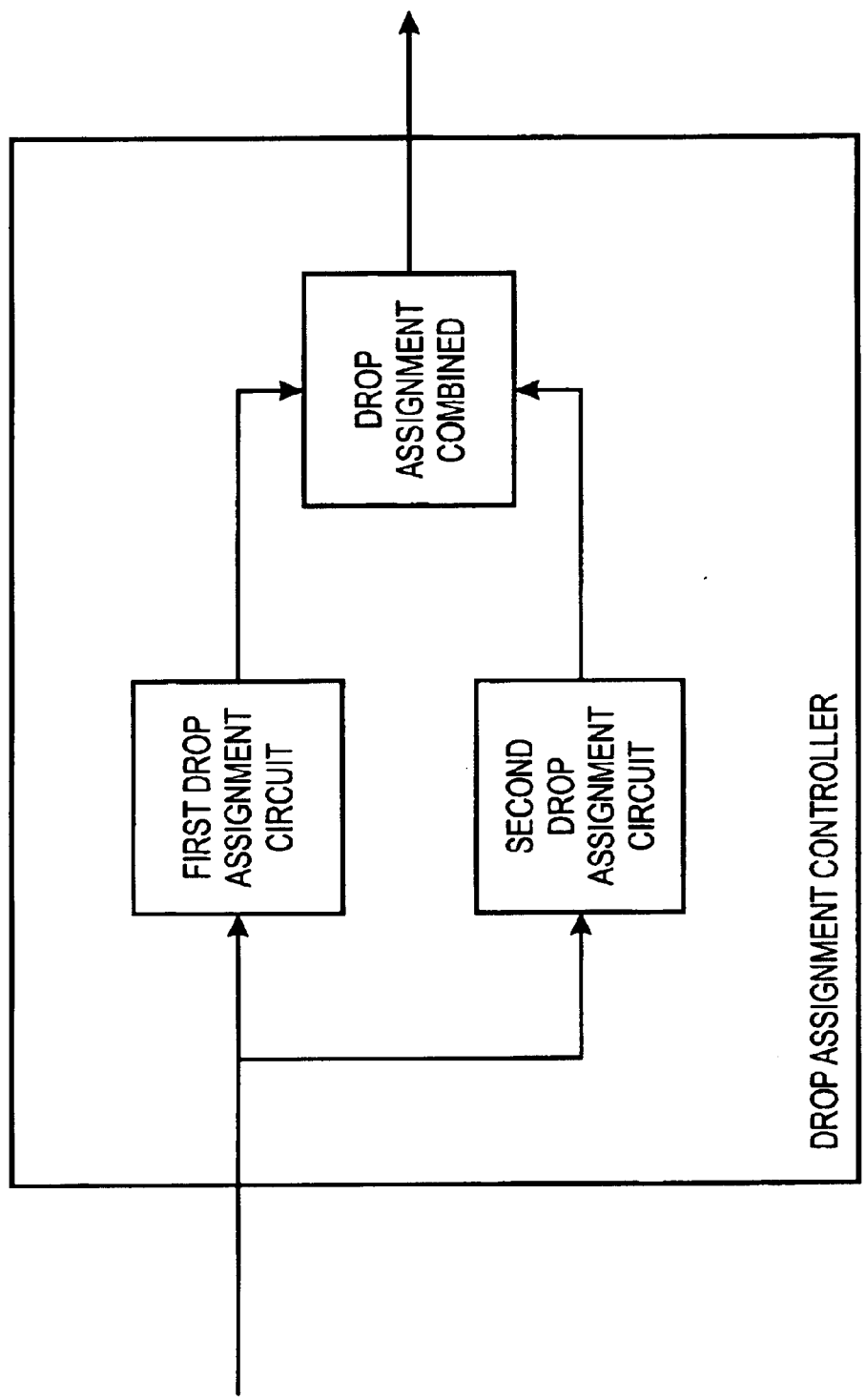
FIG. 6 shows one exemplary embodiment of the drop assignment controller shown in FIG. 5.

FIG. 6 shows one exemplary embodiment of the drop assignment controller 242 in accordance with the drop assignment control methods and systems of this invention.

As shown in FIG. 6, the drop assignment controller 242 includes a first drop assignment control circuit 2422 that runs a first drop-assignment routine for the print elements 3224, a second drop control circuit 2424 that runs a second drop-assignment routine of the print elements 3124, and a drop assignment combiner 2426 that combines the two separate drop assignments to the print elements 3124 and 3224 through the output controller 246.

In accordance with the drop assignment control methods and system of this exemplary embodiment of this invention, image processing for the drops from the print elements 3124 and the drops from the print elements 3224 are different. Accordingly, the drop assignment controller 242 runs two drop-assignment routines independently, the first routine for the print elements 3124, and the second routine for the print elements 3224.

It should be appreciated that, though FIG. 6 shows that two drop control circuits 2422 and 2424 are provided, only one drop control circuit may be provided instead. That is, as discussed above, only one ink cartridge may be provided. In such a case, a single assignment routine for controlling the ink ejection of the single ink cartridge may be provided, which would provide the multi-level output from the print elements of the single ink cartridge.

The second drop-assignment routine of the second drop assignment control circuit 2424 shown in FIG. 6 is provided to introduce a drop assignment overlap that breaks up the uniformity of a one-drop-per-pixel gray level of the first drop assignment by the first drop assignment circuit 2422. In one exemplary embodiment, the gray level at which the drop from the second drop-assignment routine starts printing is lower than the uniform-drop-per-pixel gray level of the first drop-assignment routine.

In accordance with the drop assignment control methods and system of this embodiment of this invention, the regions at which the first number of drops and the second number of drops are put down overlap. This allows an effective use of the available levels and avoids a big jump in the transition region. Thus, the pattern in which a uniform number of drops is put down at every pixel is reduced, and a randomized pattern of overlapping first and second drops is obtained.

In one exemplary embodiment of the drop assignment control methods and systems of this invention, the drop assignment circuits 2422 and 2424 may each include a mapping circuit and an error diffusion circuit. Mapping and error diffusion algorithms are described in U.S. Pat. Nos. 5,784,496 and 5,835,238 to Mantell, each incorporated herein by reference in their entirety.

The two mapping circuits in the drop assignment circuits 2422 and 2424 do not strictly provide tone reproduction curves, but rather mappings between the input level and the levels sent to the error diffusion circuits in the drop assignment circuits 2422 and 2424. After each drop assignment, the output from the drop assignment circuits 2422 and 2424 would be 0 or 1 or each pixel. After being input to the drop assignment combiner 2426, the output image would have the values 0, 1 or 2.

In the region between the two mappings from the drop assignment circuits 2422 and 2424, the assignment of the drops for the print elements 3124 and the drops for the print elements 3224 overlap. This allows an effective use of the available levels and avoids a big jump in the transition region.

For the mapping circuits, for gray levels between 0 and 255, the mapping of the input levels for the first drop assignment circuit 2422 is, for example, extrapolated from the following levels:

| | |
|---|---|
| 0 | 0 |
| 120 | 120 |
| 225 | 255 | where the left column is the input value of the image, and the right column is the mapped output to the first drop assignment circuit 2422.

The mapping of the input levels for the second drop assignment circuit 2424 is, for example, extrapolated from the following levels:

| | |
|---|---|
| 0 | 0 |
| 90 | 0 |
| 105 | 5 |
| 135 | 20 |
| 160 | 45 |
| 190 | 90 |
| 225 | 160 |
| 255 | 255 | where the left column is the input value of the image, and the right column is the mapped output to the second drop assignment circuit 2424.

In the example shown above, the region between levels 90 and 225, the assignment from the first assignment routine and the assignment from the second assignment routine overlap. Further, a the second assignment routine may assign a drop to be printed for a particular pixel where the first assignment routine has not assigned a drop to be printed for that pixel.

It should be appreciated that although error diffusion is discussed above, other image processing algorithms for the drops may be applied. For example, the drops from the second routine may occur in dark enough regions that extra noise inherent in a stochastic halftone screen is not noticeable. Thus, the processing time may be reduced by reserving the more intensive error diffusion processing only for the highlights and midtones in the first drop assignment routine.

It should also be appreciated that though only two drops are discussed, more than two drop printing may be applied in this invention. However, for N levels, N imaging steps are not necessary. Instead, at any particular gray level, there are at most two levels being assigned. Furthermore, as discussed above, it should be appreciated that only one drop assignment routine is provided which would assign the at most two levels.

Figure 7:
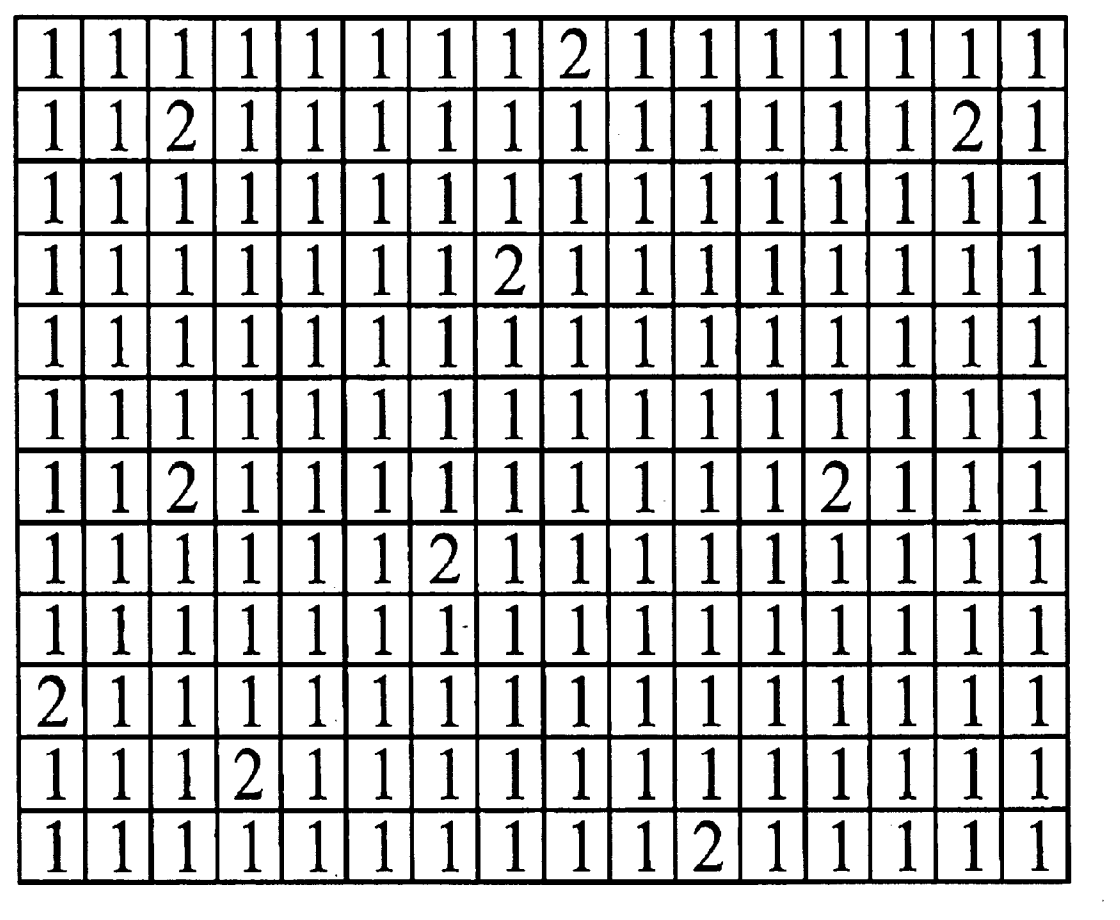
Figure 8:
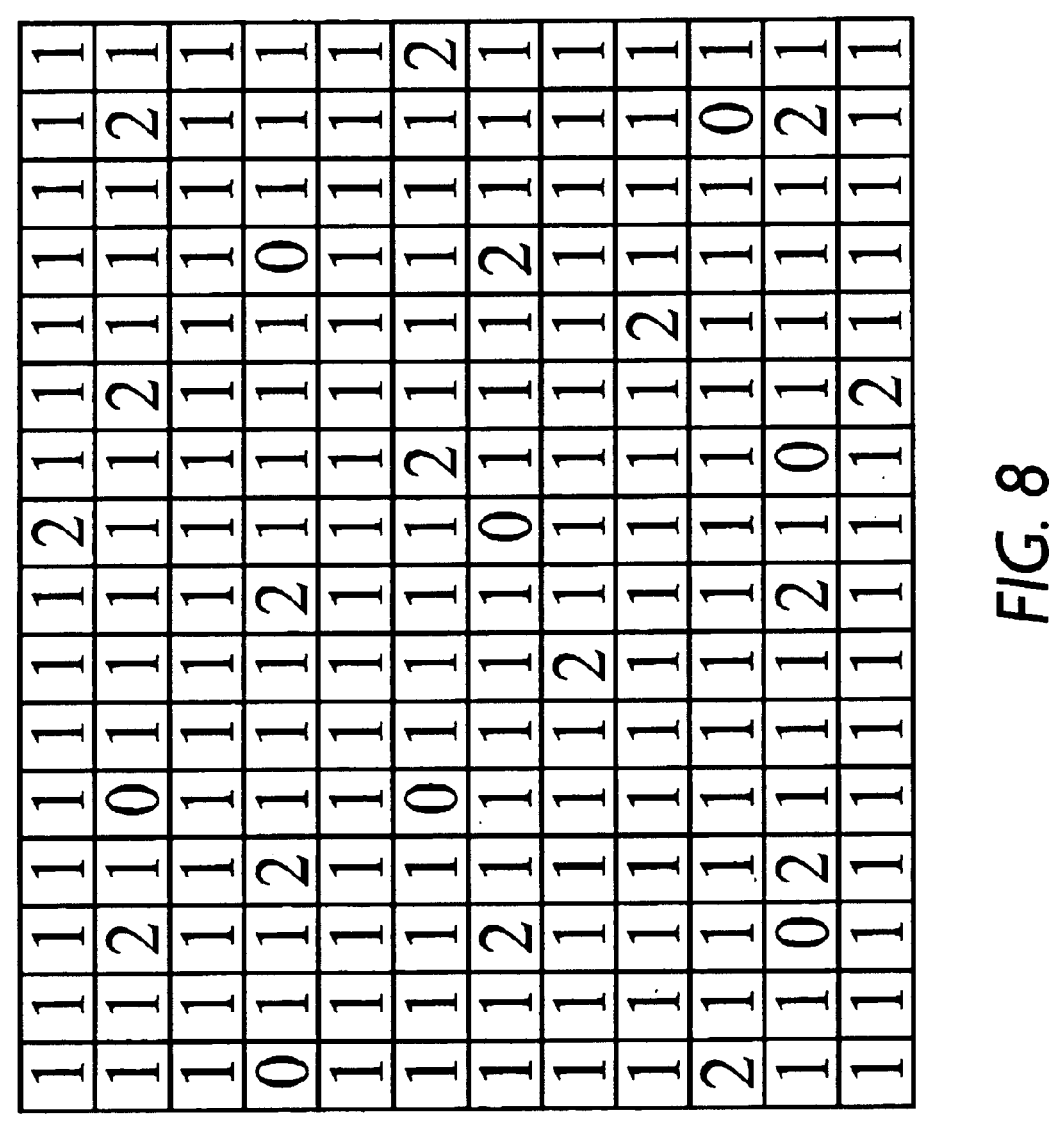

FIG. 7 shows one exemplary embodiment of a portion of an image without the drop assignment according to this invention, while FIG. 8 shows one exemplary embodiment of the portion of the image resulting from the drop assignment. The grids shown in FIGS. 7 and 8 are provided with a value of 0, 1 or 2, where 0 represents no drops, 1 represents one drop and 2 represents 2 drops.

In accordance with the exemplary embodiment as shown in FIGS. 7 and 8, the two grids have approximately the same number of drops. In FIG. 7, a second number of drops are placed over a uniform field filled with one drop having a value of 1, to provide a grid having values of 1 and 2. In FIG. 8, as a result of the drop assignment, a grid is obtained having 0 drop and 2 drop values. Accordingly, 2 drop values are intermixed with 0 drop values. That is, the assignment of the drops overlap, and thus avoids image artifacts arising from the uniformity of the uniform-drop-per-pixel gray level.

In accordance with the exemplary embodiments of the ink ejection printing system 200 described above, the process according to the invention is performed using a suitably programmed general purpose computer. However, it should be recognized that the systems and methods of the invention are not limited to application using a general purpose computer. Rather, the systems and methods according to the invention may be implemented using any suitable arrangement of electronic and imaging components, expert knowledge, or alternatively, a mixture of electronic and imaging components in conjunction with expert knowledge. Further, it should be recognized that the processes in accordance with the systems and methods of the invention may be performed by hand, using hand calculations, for example.

The image processing process according to the invention may be applied to a variety of applications and environments. Further, it should be recognized that numerous variations of the systems and methods in accordance with the invention may be performed using the general process described in conjunction with FIGS. 2–5.

In general, the drop assignment circuit 240 determines the firing of the print element 3124 or 3224. An exemplary embodiment of the drop assignment is outlined in detail below with respect to FIGS. 6–7.

Figure 9:
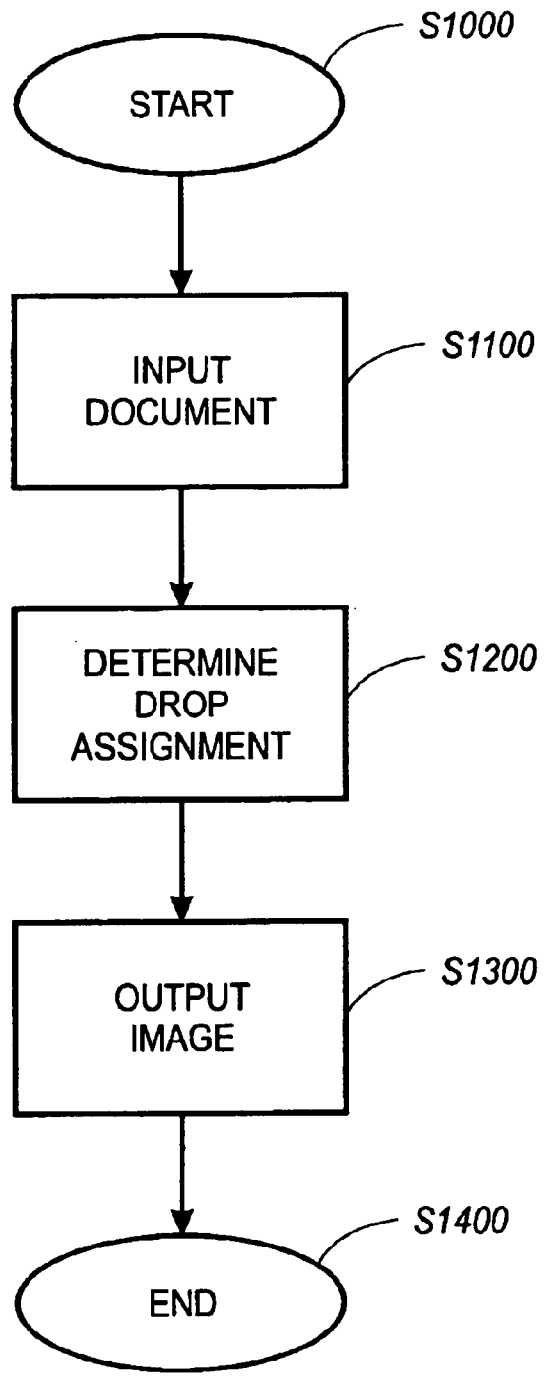
FIG. 9 is a flowchart outlining one exemplary embodiment of an image processing method according to this invention.

FIG. 9 is a flowchart outlining an image processing method according to this invention. Beginning at step S1000, control continues to step S1100, where the document is input. Then, in step S1200, the drop assignment is determined based on the input image. Control then continues to step S1300.

In step S1300, an output image is output based on the drop assignment determined. Then, in step S1400, the process stops.

Figure 10:
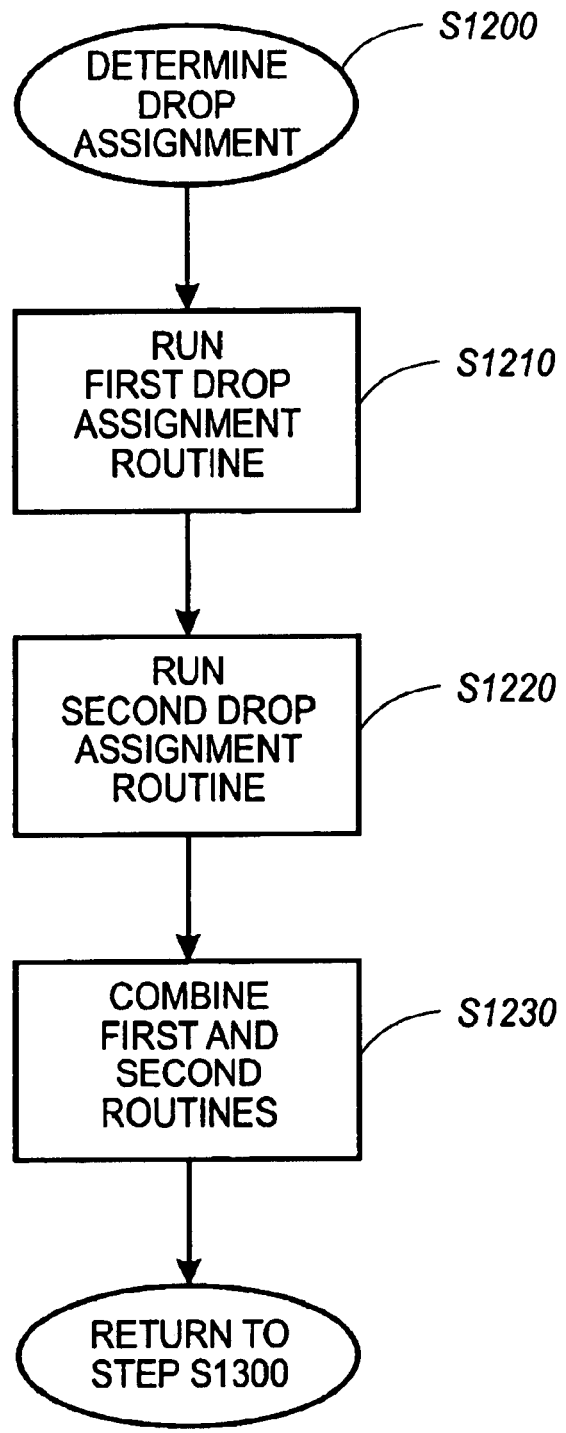
FIG. 10 is a flowchart outlining one exemplary embodiment of a drop assignment control method according to this invention.

FIG. 10 is a flowchart outlining one exemplary embodiment of the drop assignment step S1200. Beginning at step S1200, control continues to step S1210, where the first drop assignment routine is run. Then, in step S1220, a second drop assignment routine is run. Next, in step S1230, the results of the two drop assignment routines are combined. Control then continues to step S1240, where it returns to step S1300.

It should be appreciated that, as discussed above, only one drop assignment routine may be run. In such a case, steps S1210 and S1220 in FIG. 10 may be combined.

The ink ejection printing system 200 shown in FIG. 2 is preferably implemented on a programmed general purpose computer. However, the ink ejection printing system 200 shown in FIG. 2 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 9 and 10, can be used to implement the ink ejection printing system 200.

In particular, it should be understood that each of the circuits shown in FIG. 2 can be implemented as portions of a suitably programmed general purpose computer. Alternatively, each of the circuits shown in FIG. 2 can be implemented as physically distinct hardware circuits within an ASIC, or using a FPGA, a PDL, a PLA or a PAL, or using discrete logic elements or discrete circuit elements. The particular form each of the circuits shown in FIG. 2 will take is a design choice and will be obvious and predicable to those skilled in the art.

The memory 230 is preferably implemented using static or dynamic RAM. However, the memory 230 can also be implemented using a floppy disk and disk drive, a writable optical disk and disk drive, a hard drive, flash memory or any other known or later developed alterable volatile or non-volatile memory device or system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An method for forming an image using an image processing device, comprising:
   inputting image data representing an image to produce an input level for each pixel of a plurality of pixels that reproduce the image by a plurality of print elements;
   mapping from the input level to a mapping level for each pixel;
   determining drop assignment values for the pixel from the mapping levels to provide a multi-level output value that assigns none, one or more than one of the print elements corresponding to the pixel, the drop assignment values corresponding to their respective print elements; and
   forming a reproduced image based on the plurality of pixels and the determined drop assignment values, wherein the drop assignment values overlap in accordance with the multi-level output value.

2. The image processing method of claim 1, further comprising running independent drop assignment routines for the mapping.

3. The image processing method of claim 2, wherein one of the drop assignment routines is error diffusion, wherein the mapping levels are error diffusion levels.

4. The image processing method of claim 2, wherein one of the drop assignment routines is half-toning.

5. The image processing method of claim 2, wherein a gray level introduced by one of the drop assignment routines is lower than another of the drop assignment routines.

6. The image processing method of claim 1, wherein the drop assignment includes assigning various drop sizes to at least two levels.

7. The image processing method of claim 1, wherein the drop assignment includes assigning various numbers of drops to at least two levels.

8. The image processing method of claim 1, wherein the drop assignment includes assigning various drop sizes to at least two levels.

9. The image processing method of claim 1, wherein the drop assignment includes assigning drops of varying concentration to at least two levels.

10. The image processing method of claim 1, comprising running one drop assignment routine.

11. An image processing device, comprising:
- an image data input device that inputs image data representing an image to produce an input level for each pixel of a plurality of pixels that reproduce the image by a plurality of print elements;
- a mapping circuit that maps the pixel from the input level to mapping levels;
- a drop assignment determination circuit that determines drop assignment values for the pixel from the mapping levels to provide a multi-level output value that assigns none, one or more than one of the print elements corresponding to the pixel, the drop assignment values corresponding to their respective print elements; and
- an imager that forms a reproduced image based on the plurality of pixels and the determined drop assignment values, wherein the drop assignment values overlap in accordance with the multi-level output value.

12. The image processing device of claim 11, further comprising a drop assignment circuit that runs independent drop assignment routines for the mapping circuit.

13. The image processing device of claim 12, wherein one of the drop assignment routines is error diffusion, wherein the mapping levels are error diffusion levels.

14. The image processing device of claim 12, wherein one of the drop assignment routines is half-toning.

15. The image processing device of claim 12, wherein a gray level introduced by one of the drop assignment routines is lower than another of the drop assignment routines.

16. The image processing device of claim 11, wherein the drop assignment includes assigning various drop sizes to each level.

17. The image processing device of claim 11, wherein the drop assignment includes assigning various number of drops to each level.

18. The image processing device of claim 11, wherein the drop assignment includes assigning various drop sizes to each level.

19. The image processing device of claim 11, wherein the drop assignment includes assigning drops of varying concentration to each level.

20. The image processing device of claim 11, comprising a drop assignment circuit that runs one drop assignment routine.

* * * * *